(12) United States Patent
Yokohama et al.

(10) Patent No.: US 9,169,407 B2
(45) Date of Patent: Oct. 27, 2015

(54) INK FOR INKJET RECORDING, INKJET RECORDING METHOD USING THE INK, AND INK CARTRIDGE THAT ACCOMMODATES THE INK

(75) Inventors: Yuuki Yokohama, Kanagawa (JP); Akihiko Gotoh, Kanagawa (JP); Mariko Kojima, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 1114 days.

(21) Appl. No.: 13/205,837

(22) Filed: Aug. 9, 2011

(65) Prior Publication Data
US 2015/0054882 A1 Feb. 26, 2015

(30) Foreign Application Priority Data
Aug. 10, 2010 (JP) ................................ 2010-179762

(51) Int. Cl.
| | | |
|---|---|---|
| B32B 3/02 | (2006.01) | |
| C09D 11/03 | (2014.01) | |
| C09D 171/00 | (2006.01) | |
| C09D 11/326 | (2014.01) | |
| C09B 67/46 | (2006.01) | |

(52) U.S. Cl.
CPC ............. *C09D 11/03* (2013.01); *C09D 11/326* (2013.01); *C09D 171/00* (2013.01); *C09B 67/0084* (2013.01); *Y10T 428/24901* (2015.01)

(58) Field of Classification Search
CPC ...... C09D 11/30; C09D 11/40; C09D 11/326; Y10T 428/24901; C09B 67/0084
See application file for complete search history.

(56) References Cited

U.S. PATENT DOCUMENTS
| | | | |
|---|---|---|---|
| 5,952,048 | A | 9/1999 | Tsubuko et al. |
| 6,578,958 | B2 | 6/2003 | Gotoh et al. |
| 6,695,443 | B2 | 2/2004 | Arita et al. |
| 6,730,149 | B2 | 5/2004 | Arita et al. |
| 6,730,155 | B2 | 5/2004 | Gotoh et al. |

(Continued)

FOREIGN PATENT DOCUMENTS
| | | |
|---|---|---|
| JP | 2006-160950 | 6/2006 |
| JP | 2009-161726 | 7/2009 |

OTHER PUBLICATIONS

Claims, Abstract and Drawings in U.S. Appl. No. 13/038,675, filed Mar. 2, 2011.

*Primary Examiner* — Elizabeth Mulvaney
(74) *Attorney, Agent, or Firm* — Cooper & Dunham LLP

(57) ABSTRACT

Ink containing a pigment, an alcohol alkoxylate-based surfactant, a water-soluble organic solvent, water, and a dispersion agent represented by the following chemical structure 1, wherein the ink has a dynamic surface tension of 36 mN/m or less when the life of foam at 25° C. as measured by the maximum bubble pressure technique is 15 msec:

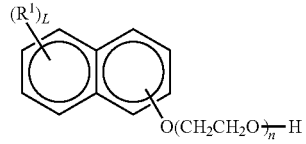

Chemical Structure 1 where $R^1$ represents an alkyl group having one to four carbon atoms, an aryl group, and an aralkyl group having one to eight carbon atoms, L represents zero or an integer of from 1 to 7, and n represents an integer of from 20 to 80.

4 Claims, 1 Drawing Sheet

(56) References Cited

U.S. PATENT DOCUMENTS

| | | |
|---|---|---|
| 6,786,588 B2 | 9/2004 | Koyano et al. |
| 6,899,751 B2 | 5/2005 | Arita et al. |
| 6,918,662 B2 | 7/2005 | Arita et al. |
| 7,033,013 B2 | 4/2006 | Koyano et al. |
| 7,094,813 B2 | 8/2006 | Namba et al. |
| 7,284,851 B2 | 10/2007 | Bannai et al. |
| 7,374,608 B2 | 5/2008 | Arita et al. |
| 7,490,930 B2 | 2/2009 | Morohoshi et al. |
| 7,682,011 B2 | 3/2010 | Namba et al. |
| 7,699,457 B2 | 4/2010 | Namba et al. |
| 7,810,919 B2 | 10/2010 | Kojima et al. |
| 7,892,340 B2 | 2/2011 | Namba et al. |
| 2001/0029273 A1* | 10/2001 | Taniguchi et al. ............ 523/161 |
| 2006/0176349 A1 | 8/2006 | Nagai et al. |
| 2008/0233363 A1* | 9/2008 | Goto .......................... 428/195.1 |
| 2008/0254228 A1 | 10/2008 | Kojima et al. |
| 2008/0273045 A1 | 11/2008 | Morohoshi et al. |
| 2008/0302268 A1 | 12/2008 | Arita et al. |
| 2009/0041940 A1 | 2/2009 | Yokohama et al. |
| 2009/0047431 A1 | 2/2009 | Hatada et al. |
| 2009/0135218 A1 | 5/2009 | Morohoshi et al. |
| 2009/0162569 A1 | 6/2009 | Morohoshi et al. |
| 2009/0186162 A1 | 7/2009 | Namba et al. |
| 2009/0239044 A1 | 9/2009 | Habashi et al. |
| 2009/0258196 A1 | 10/2009 | Nagashima et al. |
| 2009/0263632 A1 | 10/2009 | Kojima et al. |
| 2010/0020142 A1 | 1/2010 | Bannai et al. |
| 2010/0112219 A1 | 5/2010 | Yokohama et al. |
| 2010/0271435 A1 | 10/2010 | Kojima et al. |
| 2010/0279035 A1 | 11/2010 | Namba et al. |

* cited by examiner

INK FOR INKJET RECORDING, INKJET RECORDING METHOD USING THE INK, AND INK CARTRIDGE THAT ACCOMMODATES THE INK

BACKGROUND OF THE INVENTION

1. Field of the Invention

The present disclosure relates to ink for inkjet recording, an inkjet recording method using the ink, and an ink cartridge that accommodates the ink.

2. Description of the Background Art

In the field of ink for use in inkjet recording, in which a pigment is dispersed by using a surfactant type dispersion agent, a method is known which improves the quality of images by adding an alcohol alkoxylate-based surfactant to the ink (for example, refer to Japanese patent application publication number 2009-161726 (JP-2009-161726-A)). However, images produced with ink containing such a surfactant have a low density and the viscosity stability of the ink is insufficient when stored for an extended period of time under high-temperature conditions.

SUMMARY OF THE INVENTION

In view of the foregoing, the present invention provides a novel ink containing a pigment, an alcohol alkoxylate-based surfactant, a water-soluble organic solvent, water, and a dispersion agent represented by the following chemical structure 1.

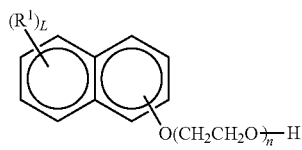

Chemical Structure 1 where $R^1$ represents an alkyl group having one to four carbon atoms, an aryl group, and an aralkyl group having one to eight carbon atoms, L represents zero or an integer of from 1 to 7, and n represents an integer of from 20 to 80. In addition, the ink has a dynamic surface tension of 36 mN/m or less when the life of foam at 25° C. as measured by the maximum bubble pressure technique is 15 msec.

It is preferred that the ink described above is prepared by mixing the alcohol alkoxylate-based surfactant, the water-soluble organic solvent, the water, and a pigment dispersion body in which the pigment is dispersed by the dispersion agent represented by the chemical structure 1.

As another aspect of the present invention, a novel inkjet recording method is provided which includes applying a stimulus to the ink described above and discharging the ink onto a recording medium to form an image thereon.

As another aspect of the present invention, a novel ink cartridge is provided which includes the ink described above and a container that accommodates the ink.

BRIEF DESCRIPTION OF THE DRAWINGS

Various other objects, features, and attendant advantages of the present invention will be more fully appreciated as the same becomes better understood from the detailed description when considered in connection with the accompanying drawings, in which like reference characters designate like corresponding parts throughout and wherein.

DETAILED DESCRIPTION OF THE PRESENT DISCLOSURE

Figure 1:
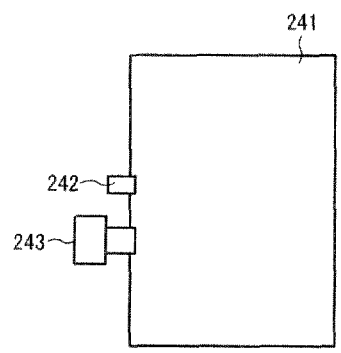
FIG. 1 is a schematic diagram illustrating an example of the process cartridge of the present disclosure.

The present invention is described in detail below with reference to accompanying drawings.

The present inventors have found that, by using ink having a dynamic surface tension greater than 36 mN/m when the life of foam at 25° C. measured using the maximum bubble pressure technique is 15 msec, the ink droplet does not spread widely upon landing on a recording medium (typically paper) and does not cover dots sufficiently, thereby failing to provide adequate image density.

By contrast, the ink used in inkjet recording (hereinafter referred to as simply "ink") of the present disclosure contains a pigment, an alcohol alkoxylate-based surfactant, a water-soluble organic solvent, a dispersion agent represented by the following chemical structure 1, and water. The pigment is preferably dispersed by the dispersion agent represented by the following chemical structure 1 to form a pigment dispersion body and the ink is prepared by mixing the alcohol alkoxylate-based surfactant, the water-soluble organic solvent, the water, and the pigment dispersion body.

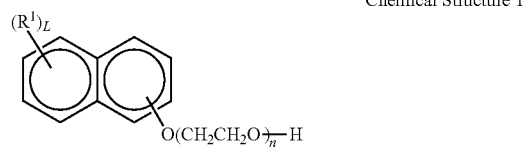

Chemical Structure 1

In the chemical structure 1, $R^1$ represents an alkyl group having one to four carbon atoms, an aryl group, and an aralkyl group having one to eight carbon atoms. L represents zero or an integer of from 1 to 7 and n represents an integer of from 20 to 80.

Alcohol Alkoxylate-Based Surfactant

The alcohol alkoxylate-based surfactant is added to reduce the dynamic surface tension of the ink, thereby improving the permeability into a recording medium.

As noted above, when the dynamic surface tension is too large, the ink droplet tends not to spread widely or cover dots sufficiently when the ink droplet lands on the recording medium. Therefore, images having a sufficient density are not easily produced.

Specific examples of the alcohol alkoxylate-based surfactant suitably used in the present disclosure include, but are not limited to, BYK DYNWET 800 (manufactured by BYK Chemie Japan) and EP-5035 and EP-7045 (manufactured by NIPPON SHOKUBAI CO., LTD.).

The added amount of the alcohol alkoxylate-based surfactant in ink is preferably from about 1.0% by weight to about 1.5% by weight.

Dispersion Agent

The dispersion agent represented by the chemical structure 1 is used to disperse the pigment. In the chemical structure 1, n represents an integer of from 20 to 80, preferably from 30 to 50. When n is too small, the dispersion stability tends to deteriorate, meaning that a pigment having a large average particle diameter is contained, which may prevent production of images having a sufficient saturation. When n is too large, the ink tends to have an increased viscosity, thereby making it difficult to perform inkjet recording.

Specific examples of the alkyl group having one to four carbon atoms in the substitution group $R^1$ in the Chemical structure 1 include, but are not limited to, a methyl group, an ethyl group, a propyl group, an isopropyl group, and a butyl group.

Specific examples of the aralkyl group having one to eight carbon atoms in the substitution group $R^1$ in the Chemical structure 1 include, but are not limited to, a benzyl group, a phenethyl group, 2-methylbenzyl group, 3-methyl benzyl group, and 4-methylbenzyl group.

Specific examples of the dispersion agent described above include, but are not limited to, polyoxyethylene (n=20)-β-naphtyl ether, polyoxyethylene (n=40)-β-naphtyl ether, and polyoxyethylene (n=60)-β-naphtyl ether. Among these, polyoxyethylene (n=40)-β-naphtyl ether is particularly preferable.

The content ratio of the dispersion agent is preferably from 0.1 to 0.5 parts by weight based on 1 part by weight of the pigment in the ink.

When the content of the dispersion agent is in that range, the pigment is sufficiently dispersed and the viscosity of the ink increases so that image production by ink jet recording is not difficult.

Pigment

There is no specific limitation on the type of pigment used as a coloring agent. Inorganic pigments and organic pigments can be selected as suitable. These can be used alone or in combination.

Specific examples of the inorganic pigments include, but are not limited to, titanium oxide, iron oxide, calcium carbonate, barium sulfate, aluminum hydroxide, barium yellow, iron blue, cadmium red, chromium yellow, metal powder, and carbon black.

Specific examples of the organic pigments include, but are not limited to, azo pigments, azomethine pigments, polycyclic pigments, dye chelates, nitro pigments, nitroso pigments, and aniline black. Among these, azo pigments and polycyclic pigments are preferable.

Specific examples of the azo pigments include, but are not limited to, azo lake, insoluble azo pigments, condensed azo pigments, and chelate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindorinone pigments, quinophthalone pigments, and Rhodamine B lake pigments.

With regard to black ink, specific examples thereof include, but are not limited to, carbon blacks (C.I. Pigment black 7) such as furnace black, lamp black, acetylene black, and channel black, metals such as copper, iron (C.I. Pigment black 11), and titanium oxide, and organic pigments such as aniline black (C.I. Pigment black 1).

The carbon black is manufactured by a furnace method or a channel method and has a primary particle diameter of from 15 nm to 40 nm, a specific surface area as measured by the BET method of from 50 to 300 m²/g, a DBP oil absorption amount of from 40 to 150 mL/100 g, a volatile amount of from 0.5% to 10%, and a pH value of from 2 to 9.

Specific examples of commercially available carbon black products include, but are not limited to, No. 2300, No. 900, MCF-88, No. 33, No. 40, No. 45, No. 52, MA7, MA8, MA100, and No. 2200B (all of which are manufactured by Mitsubishi Chemical Corporation), Raven 700, Raven 5750, Raven 5250, Raven 5000, Raven 3500, Raven 1255 (all of which are manufactured by Columbian Chemicals Company), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all of which are manufactured by Cabot Corporation), Color black FW1, Color black FW2, Color black FW2V, Color black FW18, Color black FW200, Color black S150, Color black 5160, Color black 5170, Printex 35, Printex U, Printex V, Printex 140U, Printex 140V, Special black 6, Special black 5, Special black 4A, and Special black 4 (All of which are manufactured by Degussa AG).

With regard to yellow ink, specific examples there of include, but are not limited to, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

With regard to magenta ink, specific examples there of include, but are not limited to, C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and Pigment Violet 19.

With regard to cyan ink, specific examples there of include, but are not limited to, C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66, C.I. Vat Blue 4, and C.I. Vat Blue 60.

Ink having excellent color tone and light resistance with a good balance is obtained by using a good combination of those, which are Pigment Yellow 74 as yellow pigment, Pigment Red 122 or Pigment Violet 19 as magenta pigment, and Pigment blue 15:3 as cyan pigment.

The content of the pigment in the toner is preferably from 0.1% to 50.0% by weight, more preferably from 0.1% to 20% by weight.

The pigment preferably has a 50% average particle diameter (D50) of 150 nm or less, more preferably 100 nm or less.

The 50% average particle diameter is measured by Microtrack UPA (manufactured by Nikkiso Co., Ltd.) based on a dynamic light scattering method in an environment of 23° C. and 55% RH.

Water Soluble Organic Solvent

The water soluble organic solvent is added to allow the moisturizing effect and improve the discharging stability.

Specific examples of the water soluble organic solvents are as follows:

polyols such as ethylene glycol, diethylene glycol, triethylene glycol, polyethylene glycol, polypropylene glycol, 1,3-butylene glycol, 3-methyl-1,3-butylene glycol, 1,5-pentane diol, 1,6-hexane diol, 2-ethyl-1,3-hexane diol, glycerin, 1,2,3-butanetriol, 1,2,6-hexane triol, and petriol; polyalcohol alkyl ethers such as ethyleneglycol monoethylether, ethyleneglycol monobutylether, diethylene glycol monomethylether, diethylene glycol monoethylether, diethylene glycolmonobutylether, tetraethylene glycol monomethylether, and propyleneglycol monoethylether; polyalcohol aryl ethers such as ethyleneglycol monophenylether and ethyleneglycol monobenzylether; nitrogen-containing heterocyclic compounds such as 2-pyrolidone, N-methyl-2-pyrolidone, N-hydroxyethyl-2-pyrolidone, 1,3-dimethylimidazolidinone, ε-caprolactam, and γ-butyrolactone; amides such as formamide, N-methylformamide, and N,N-dimethylformamide; amines such as monoethanol amine, diethanol amine, and triethylamine; sulfur-containing compounds such as dimethylsufoxide, sulfolane, and thiodiethanol; propylene carbonate; and ethylene carbonate. These can be used alone or in combination.

Containing 1,3-butylene glycol, diethylene glycol, triethylene glycol, and/or glycerin is preferable in terms of prevention of discharging trouble caused by moisture evaporation.

The added amount of the water soluble organic solvent is preferably from 30% to 40% by weight of the whole ink. Within that range, increase of viscosity of ink caused by moisture evaporation in an inkjet recording device is minimized and increase of viscosity of ink caused by moisture evaporation on landing of ink on a recording medium reduces image blur, resulting in production of quality images. When the added amount is too small, moisture evaporation easily occurs so that the viscosity of ink increases due to moisture evaporation in the ink supplying system in an inkjet recording device, which may cause ink clogging, etc.

In addition, an added amount that is too large may require reduction of the solid portion of pigments and resins to obtain a desired viscosity of ink, which may lead to a decrease in the image density.

In addition, when the added amount is too large, ink clogging in an inkjet recording device rarely occurs but the viscosity of the ink does not easily increase on landing of the ink on a recording medium, which may result in occurrence of bleeding.

The ink of the present disclosure optionally contains various additives such as a resin emulsion, a defoaming agent, a pH conditioner, an antiseptic and antifungal agent, a corrosion control agent, and an anti-oxidant in addition to the components described above.

Resin Emulsion

The resin emulsion is added to improve the dispersion stability of the ink.

Any suitable commercially available resin emulsion can be used. Specific examples thereof include, but are not limited to, SF460, SF460S, SF420, SF110, SF300, and SF361 (urethane based resin emulsions, all of which are manufactured by Nippon Unicar Company Limited); and W5025 and W5661 (urethane based emulsion, all of which are manufactured by Mitsui Chemicals, Inc.).

The added amount of the resin emulsion in ink is preferably from about 0.5% to 5% by weight in a solid form. When the added amount is too small, the dispersion stability of the pigment tends to be insufficient. When the added amount is too large, the solid portion in ink tends to increase, thereby increasing the ink viscosity, which makes it difficult to discharge ink.

Defoaming Agent

The defoaming agent is added to prevent foaming.

Any suitable commercially available defoaming agent can be used. Specific examples thereof include, but are not limited to, KS-508, KS-531, KM-72, KM-72F, KM-90, and KM-98 (manufactured by Shin-Etsu Chemical Co., Ltd.); SF-8427, SF-8428, SF-3749, SF-8400, FZ-2101, FZ-2104, FZ-2118, FZ-2203, and FZ-2207 (manufactured by Dow Corning Toray); and BYK-345, BYK-346, and BYK-348 (manufactured by BYK Chemie Japan).

The added amount of the defoaming agent is preferably from 0.05% to 1% by weight and more preferably from 0.1% to 0.5% by weight. When the added amount is too small, the defoaming effect tends to be insufficient. An added amount that is too large tends to have an adverse impact on the preservation stability and the discharging stability.

pH Conditioner, Antiseptic and Antifungal Agent, Corrosion Control Agent, and Anti-Oxidant Any pH conditioner that adjusts pH of a prescribed ink to be 7 or higher without an adverse impact thereon can be suitably used. Specific examples thereof include, but are not limited to, amines such as diethanol amine and triethanol amine; hydroxides of alkali metal elements such as lithium hydroxide, sodium hydroxide, and potassium hydroxide; ammonium hydroxide, quaternary ammonium hydroxide, quaternary phosphonium hydroxide; and carboxylic acid salts of alkali metals such as lithium carbonate, sodium carbonate, and potassium carbonate.

Specific examples of the antiseptic and antifungal agents include, but are not limited to, 1,2-benzisothiazoline-3-on, dehydro sodium acetate, sodium sorbate, 2-pyridinethiol-1-oxide sodium, sodium beozoate, and pentachlorophenol sodium.

Specific examples of the corrosion control agents include, but are not limited to, acid sulfites, thiosodium sulfate, ammonium thioglycolic acid, diisopropyl ammonium nitrite, tetra nitric acid pentaerythritol, and dicyclohexyl ammonium nitrite.

Specific examples of the anti-oxidants include, but are not limited to, phenol-based anti-oxidants (including hindered phenol based anti-oxidants), amine-based anti-oxidants, sulfur-based anti-oxidants, and phosphorous-based anti-oxidants.

A description is now given of an ink cartridge for holding the ink.

Figure 2:
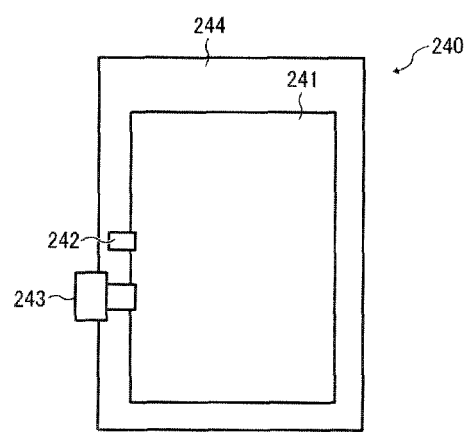
FIG. 2 is a schematic diagram illustrating a housing of the ink cartridge illustrated in FIG. 1.

FIG. 1 is a diagram illustrating an example of the ink cartridge of the present disclosure. FIG. 2 is a diagram illustrating a diagram illustrating the ink cartridge of FIG. 1 with an outer case.

As illustrated in FIG. 2, ink is supplied from an ink inlet 242 to an ink bag 241 in an ink cartridge 240 followed by discharging air in the ink bag 241, after which the ink inlet 242 is closed by fusing.

A needle provided to a recording device pierces an ink outlet 243 formed of a rubber member to supply the ink to the recording device when images are formed.

The ink bag 241 is formed by a package member such as aluminum laminate film having no ventilation property.

As illustrated in FIG. 2, the ink bag 241 is accommodated in a cartridge case 244 made of plastic, which is detachably attachable to various inkjet recording devices for use.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative examples but not limited thereto.

The values in Table are in % by weight.

Examples 1 to 6 and Comparative Examples 1 to 4

Preparation of Dispersion Body

The pigment, the dispersion agent represented by the chemical structure 1 (L=0, n=40), and water are preliminarily mixed by the blending ratio shown in Table 1. Thereafter, the mixture is circulated and dispersed by a disc type bead mill (KDL type, zirconia ball having a diameter of 0.3 mm, manufactured by Shinmaru Enterprises Corporation) to obtain a magenta pigment dispersion body.

Preparation of Ink

Mixtures are prepared by using the recipes of Examples and Comparative Examples shown in Table 1. After one and a half hours, the mixtures are filtered by a membrane filter having an opening hole of 0.8 μm to obtain each ink.

The mixtures are prepared by adding a water-soluble organic solvent, a surfactant, and water (deionized water) in that sequence. After a half hour stirring, the pigment dispersion body, a resin emulsion, and a defoaming agent are added followed by a one hour stirring to prepare ink.

The ink of each Example and Comparative Example is subjected to dynamic surface tension measuring, a preservation test, and an image density measuring.

Dynamic Surface Tension

The dynamic surface tension is measured for each ink by SITA Dyno Tester (manufactured by SITA Messtechnic GmbH) when the life of foam at 25° C. measured by maximum bubble pressure technique is 15 msec.

Preservation Test

Each ink is placed in a sealed container and preserved at 70° C. for 14 days. The ink viscosity before and after preservation is measured at 25° C. by an R type viscometer (manufactured by Toki Sangyo Co., Ltd.) and evaluated according to the following criteria.

Evaluation Criteria

A: Viscosity variance before and after preservation is less than 3%

B: Viscosity variance before and after preservation is from 3% to less than 4.5%

C: Viscosity variance before and after preservation is 4.5% or greater

Image Density

Each ink is filled into an inkjet printer (IPSiO GX3000, manufactured by Ricoh Co., Ltd.) and magenta solid images are printed on MyRecyclePaper GP paper (manufactured by NBS Ricoh) at a plain paper faster mode at 25° C. and 50% RH. The color of the images is measured by X-Rite 938 (manufactured by X-Rite Corporation) for evaluation according to the following criteria.

Evaluation Criteria

A: Image density: 0.84 or higher

B: Image density: 0.80 to less than 0.84

C: Image density: less than 0.80

TABLE 1

| | | | Ex. 1 | Ex. 2 | Ex. 3 | Ex. 4 | Ex. 5 |
|---|---|---|---|---|---|---|---|
| Pigment dispersion body | Pigment | Pigment Red 122 | 15 | 15 | 15 | 15 | |
| | | Pigment Blue 15:3 | | | | | 15 |
| | | Pigment Yellow 74 | | | | | |
| | Dispersion agent | Chemical structure 1 (n = 40) | 4 | 4 | 4 | 4 | 4 |
| | Water | Deionized water | Rest | Rest | Rest | Rest | Rest |
| Ink | Pigment dispersion body | Pigment dispersion body | 40 | 40 | 40 | 40 | 40 |
| | Water-soluble organic solvent | Glycerin | 10 | 10 | 10 | 10 | 10 |
| | | Diethylene Glycol | 30 | 30 | 30 | 30 | 30 |
| | Surfactant | BYK-DYNWET 800 | 1.0 | 1.5 | 1.2 | 1.4 | 1.0 |
| | | EP-5035 | | | | | |
| | | EP-7045 | | | | | |
| | Resin emulsion | W5025 (Urethane-based) | 3.0 | | 3.0 | | |
| | | W5661 (Urethane-based) | | 3.0 | | 3.0 | 3.0 |
| | | J-450 (Styrene-acrylic-based) | | | | | |
| | Defoaming agent | KM-72F | 0.1 | 0.1 | 0.1 | 0.1 | 0.1 |
| | Water | Deionized water | Rest | Rest | Rest | Rest | Rest |
| Evaluation | Dynamic surface tension (mN/m) | | 35.7 | 34.6 | 35.3 | 35.0 | 35.5 |
| | Preservation test | | A | B | A | A | A |
| | Image test | | A | A | A | A | A |

TABLE 1-continued

|  |  |  | Ex. 6 | Comp. 1 | Comp. 2 | Comp. 3 | Comp. 4 |
|---|---|---|---|---|---|---|---|
| Dispersion body | Pigment | Pigment Red 122 |  | 15 | 15 | 15 | 15 |
|  |  | Pigment Blue 15:3 |  |  |  |  |  |
|  |  | Pigment Yellow 74 | 15 |  |  |  |  |
|  | Dispersion agent | Chemical structure 1 (n = 40) | 4 | 4 | 4 | 4 | 4 |
|  | Water | Deionized water | Rest | Rest | Rest | Rest | Rest |
| Ink | Pigment dispersion body | Pigment dispersion body | 40 | 40 | 40 | 40 | 40 |
|  | Water-soluble organic solvent | Glycerin | 10 | 10 | 10 | 10 | 10 |
|  |  | Diethylene Glycol | 30 | 30 | 30 | 30 | 30 |
|  | Surfactant | BYK-DYNWET 800 | 1.0 | 0.05 | 0.5 |  |  |
|  |  | EP-5035 |  |  |  |  | 0.3 |
|  |  | EP-7045 |  |  |  | 1.0 |  |
|  | Resin emulsion | W5025 (Urethane-based) |  | 3.0 |  | 3.0 |  |
|  |  | W5661 (Urethane-based) | 3.0 |  | 3.0 |  |  |
|  |  | J-450 (Styrene-acrylic-based) |  |  |  |  | 0.7 |
|  | Defoaming agent | KM-72F | 0.1 | 0.1 | 0.1 | 0.1 | 0.03 |
|  | Water | Deionized water | Rest | Rest | Rest | Rest | Rest |
| Evaluation | Dynamic surface tension (mN/m) |  | 35.6 | 40.0 | 37.4 | 37.2 | 39.0 |
|  | Preservation test |  | A | A | A | C | C |
|  | Image test |  | A | C | C | B | C |

In Table 1, BYK-DWNWET 800 (manufactured by BYK Chemie Japan) and EP-5035 and EP-7045 (manufacture by Nippon Shokubai Co., Ltd.) are alcohol alkoxylate-based surfactants. W5025 and W5661 (manufactured by Mitsui Chemicals Inc.) are urethane-based emulsions and J-450 (manufactured by Johnson Polymer Co., Ltd.) is styrene acrylic-based resin emulsion. In addition, KM-72F (manufactured by ShinEtsu Chemical Co., Ltd.) is a defoaming agent.

As seen from the results in Table 1, images produced with the ink of Examples having a dynamic surface tension of 36 mN/m or less have excellent preservation and image density. By contrast, images produced with the ink of Comparative Examples having a dynamic surface tension greater than 36 mN/m have a low density.

In particular, in Comparative Examples 1, 2, and 4 in which the added amount of the alcohol alkoxylate-based surfactant is 0.5% by weight or less, the image density evaluation is C.

Furthermore, in Comparative Examples 3 and 4, the preservation test is not good, either.

Therefore, it is found that, according to the ink of the present disclosure, which includes at least the pigment, the alcohol alkoxylate-based surfactant, the water-soluble organic solvent, water, and the dispersion agent represented by the chemical structure 1, the image density is improved while the viscosity stability under high-temperature conditions is sufficiently secured. Also, by providing an inkjet recording method using the ink and an inkjet cartridge that accommodates the ink, the image density is improved while the viscosity stability under high-temperature conditions is sufficiently secured.

This document claims priority and contains subject matter related to Japanese Patent Application No. 2010-179762, filed on Aug. 10, 2010, the entire contents of which are hereby incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. Ink comprising:
a pigment;
an alcohol alkoxylate-based surfactant;
a water-soluble organic solvent;
water; and
a dispersion agent represented by a chemical structure 1:

Chemical Structure 1

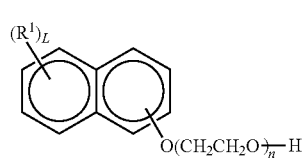

where $R^1$ represents an alkyl group having one to four carbon atoms, an aryl group, and an aralkyl group having one to eight carbon atoms, L represents zero or an integer of from 1 to 7, and n represents an integer of from 20 to 80, wherein a content of the alcohol alkoxylate-based surfactant in the ink is from 1.0% to 1.5% by weight, and wherein the ink has a dynamic surface tension of 36 mN/m or less when the life of foam of the ink at 25° C. as measured by the maximum bubble pressure technique is 15 msec.

2. The ink according to claim 1, prepared by mixing the alcohol alkoxylate-based surfactant, the water-soluble organic solvent, the water, and a pigment dispersion body in which the pigment is dispersed by the dispersion agent represented by the chemical structure 1.

3. An inkjet recording method comprising:

applying a stimulus to the ink of claim 1; and discharging the ink onto a recording medium to form an image thereon.

4. An ink cartridge comprising:

the ink of claim 1; and a container that accommodates the ink.

\* \* \* \* \*